US010743733B2

(12) United States Patent
Stickney (10) Patent No.: US 10,743,733 B2
(45) Date of Patent: Aug. 18, 2020

(54) DOMESTIC APPLIANCE AND PART THEREOF

(71) Applicant: Dyson Technology Limited, Wiltshire (GB)

(72) Inventor: Timothy Nicholas Stickney, Gloucester (GB)

(73) Assignee: Dyson Technology Limited, Malmesbury, Wiltshire (GB)

(*) Notice: Subject to any disclaimer, the term of this patent is extended or adjusted under 35 U.S.C. 154(b) by 801 days.

(21) Appl. No.: 15/410,497

(22) Filed: Jan. 19, 2017

(65) Prior Publication Data

US 2017/0209014 A1 Jul. 27, 2017

(30) Foreign Application Priority Data

Jan. 22, 2016 (GB) .................................. 1601222.1

(51) Int. Cl.
*A47L 5/24* (2006.01)
*A47L 9/28* (2006.01)
(Continued)

(52) U.S. Cl.
CPC .............. *A47L 9/2857* (2013.01); *A47L 5/225* (2013.01); *A47L 5/24* (2013.01); *A47L 5/28* (2013.01);
(Continued)

(58) Field of Classification Search
CPC .. A47L 11/40; A47L 11/4002; A47L 11/4005; A47L 11/4008; A47L 5/225;
(Continued)

(56) References Cited

U.S. PATENT DOCUMENTS

| 2,418,130 | A | | 4/1947 | Lofgren | |
|---|---|---|---|---|---|
| 3,312,801 | A | * | 4/1967 | Schleicher | ............... H01H 9/06 200/437 |

(Continued)

FOREIGN PATENT DOCUMENTS

| GB | 2 409 770 | 7/2005 |
|---|---|---|
| GB | 2475312 | 5/2011 |

(Continued)

OTHER PUBLICATIONS

Search Report dated Jul. 12, 2016, directed to GB Application No. 1601222.1; 1 page.

(Continued)

*Primary Examiner* — Joseph J Hail
*Assistant Examiner* — Arman Milanian
(74) *Attorney, Agent, or Firm* — Morrison & Foerster LLP (57) ABSTRACT

A domestic appliance includes an electric motor; a switch assembly for selectively connecting the motor to a power source; a handle; and a manually-operable trigger movable relative to the handle between an active position and a passive position. The trigger and the switch assembly are arranged such that the switch assembly is in a motor-connecting state when the trigger is in the active position, and is in a motor-disconnecting state when the trigger is in the passive position. The domestic appliance comprises a first biasing member which is arranged to urge the trigger away from the passive position and towards the active position.

24 Claims, 7 Drawing Sheets

(51) Int. Cl.
*A47L 9/16* (2006.01)
*A47L 9/32* (2006.01)
*A47L 5/28* (2006.01)
*A47L 5/22* (2006.01)
*A47L 9/24* (2006.01)
*H01M 2/10* (2006.01)

(52) U.S. Cl.
CPC ............ *A47L 9/1608* (2013.01); *A47L 9/242* (2013.01); *A47L 9/28* (2013.01); *A47L 9/2884* (2013.01); *A47L 9/322* (2013.01); *H01M 2/1022* (2013.01)

(58) Field of Classification Search
CPC . A47L 5/24; A47L 5/28; A47L 9/1608; A47L 9/242; A47L 9/28; A47L 9/2842; A47L 9/2857; A47L 9/2884; A47L 9/322; H01H 1/36; H01H 1/5866; H01H 13/06; H01H 13/12; H01H 3/20; H01M 2/1022
See application file for complete search history.

(56) References Cited

U.S. PATENT DOCUMENTS

| | | | |
|---|---|---|---|
| 3,847,233 | A | 11/1974 | Glover et al. |
| 4,558,823 | A | 12/1985 | Groth |
| 5,305,528 | A | 4/1994 | Garrison |
| 5,604,954 | A * | 2/1997 | Webster .................. A47L 5/14 15/330 |
| 6,057,518 | A * | 5/2000 | Bascom .................. H01H 3/20 200/321 |
| 6,314,236 | B1 * | 11/2001 | Taylor .................... A45D 20/10 200/50.01 |
| 6,326,570 | B1 | 12/2001 | Fujii et al. |
| 7,225,503 | B1 | 6/2007 | Lenkiewicz et al. |
| 9,711,986 | B2 * | 7/2017 | Sunderland .......... H02J 7/0063 |
| 2002/0194696 | A1 * | 12/2002 | Sergyeyenko ............ A47L 5/24 15/339 |
| 2013/0205538 | A1 * | 8/2013 | Thompson ............ A47L 9/2857 15/344 |

FOREIGN PATENT DOCUMENTS

| | | |
|---|---|---|
| GB | 2499240 | 8/2013 |
| JP | 57-103628 | 12/1955 |
| JP | 1-185232 | 7/1989 |
| JP | 2001-84867 | 3/2001 |
| JP | 2007-11840 | 1/2007 |
| JP | 2009-54467 | 3/2009 |
| JP | 2012-128659 | 7/2012 |
| WO | WO-2013/117901 | 8/2013 |

OTHER PUBLICATIONS

International Search Report and Written Opinion dated Mar. 20, 2017, directed to International Application No. PCT/GB2016/053913; 15 pages.

* cited by examiner

DOMESTIC APPLIANCE AND PART THEREOF

REFERENCE TO RELATED APPLICATIONS

This application claims the priority of United Kingdom Application No. 1601222.1, filed Jan. 22, 2016, the entire contents of which are incorporated herein by reference.

FIELD OF THE INVENTION

The present invention relates to the field of domestic appliances and has particular, but not exclusive, application to vacuum cleaners.

BACKGROUND OF THE INVENTION

There are various types of vacuum cleaners available on the market, and these can be categorized generally into 'cylinder' vacuum cleaners, 'upright' vacuum cleaners, 'handheld' vacuum cleaners and 'stick' vacuum cleaners (also known as 'stick-vacs').

Cylinder and upright vacuum cleaners are generally used as a household's primary vacuum cleaner, for heavy-duty cleaning tasks around the home. Handheld and stick vacuum cleaners, unlike most cylinder and upright vacuum cleaners, are portable in the sense that they are light enough to be carried in the hand rather than being supported on the floor by a rolling assembly. Handheld and stick vacuum cleaners are typically powered by batteries, and are often used for low-duty cleaning jobs such as spot-cleaning of floors, upholstery and vehicle interiors.

Common with all types of vacuum cleaners (and indeed many other types of domestic appliance) is the requirement for a user to be able to turn them on and off. Since cylinder and upright vacuum cleaners are generally used for relatively long periods of time, they are usually provided with a simple on/off button that can be pressed to turn the machine on and then pressed again to turn the machine off. Since handheld and stick vacuums are often used in short bursts on an ad-hoc basis, they are commonly fitted with a trigger which can be depressed by a user to turn the machine on, and released to turn it off.

The invention relates to improvements in the means for activating and deactivating household appliances such as vacuum cleaners, and is particularly suited to handheld appliances such as stick-vacs and handheld vacuum cleaners.

SUMMARY OF THE INVENTION

According to a first aspect of the present invention there is provided a domestic appliance comprising:
  i) an electric motor;
  ii) a switch assembly for selectively connecting the motor to a power source;
  iii) a handle; and
  iv) a manually-operable trigger movable relative to the handle between an active position and a passive position,
wherein:
  v) the trigger and the switch assembly are arranged such that the switch assembly is in a motor-connecting state when the trigger is in the active position, and is in a motor-disconnecting state when the trigger is in the passive position; and
  vi) the domestic appliance comprises a first biasing member which is arranged to urge the trigger away from the passive position and towards the active position.

The presence of the first biasing member urging the trigger towards the active position may allow any 'slack' or 'play' in the trigger to be taken up by the trigger before the trigger is operated by a user. This, in turn, may allow more relaxed manufacturing or quality control testing tolerances to be utilized, since any play introduced by manufacturing variance can be accommodated by the spring and trigger rather than being allowed to obstruct proper functioning of the trigger or allow the trigger to rattle. The ability to use less exacting manufacturing tolerances may allow tooling costs to be lower, and/or may decrease wastage by reducing the number of machines which fail quality control inspection because of manufacturing variation. In addition, the first biasing member taking up any slack in the trigger may allow the switch assembly to enter the motor-connecting state more quickly when the trigger is operated by the user. In other words, the first biasing member may allow the trigger to be more responsive.

It is to be understood that reference to an object moving 'towards' a position, as used herein, should be interpreted to mean that the object moves part way or all the way to that position. Reference to an object moving 'to' a position is intended to mean that the object moves all the way to that position.

The electric motor may be a brushed or brushless DC motor, or an AC motor such as an induction motor or a synchronous motor.

The first biasing member may act directly on the trigger, or may act indirectly on the trigger (for instance by urging another component to move, the motion of that component causing the trigger to move towards the active position).

The first biasing member may be configured to urge the trigger all the way to the active configuration.

The term 'trigger' is used to refer to a component which is movable, so as to provide a control input, by the hand of a user which is grasping the handle. The term is not intended to be limited to arrangements which resemble the trigger of a gun in form or function. For instance, the trigger may take the form of a suitably positioned push-button or a thumb-operated lever. As an illustration, the 'thumb-safety' of a pistol would constitute a trigger within the meaning of the present invention.

The domestic appliance may further comprise a second biasing member which is arranged to urge the trigger away from the active position and towards the passive position. This may be advantageous in that the second biasing member can be arranged to prevent the trigger moving to the active position without input from the user (for instance under action of the first biasing member).

As an alternative, the trigger may be manually movable away from the active position and towards the passive position.

The second biasing member may form part of the switch assembly.

The second biasing member may act directly on the trigger, or may act indirectly on the trigger (for instance by urging another component to move, the motion of that component causing the trigger to move towards the active position).

The second biasing member may be configured to urge the trigger all the way to the passive position.

For the avoidance of doubt, reference to a biasing member 'urging' the trigger from a position and to or towards another position is intended to refer to that biasing member applying a force to the trigger which would make the trigger move in this was in the absence of any other factors. It is not intended to mean that the trigger necessarily travels between these positions. For instance, the first biasing member may urge the trigger from the passive position all the way to the active position, but the trigger may be prevented from reaching the active position (in the absence of a force applied by a user) by the second biasing member.

The trigger and second biasing member may be configured such that the trigger moves out of the active position and towards the passive position, under action of the second biasing member, unless the trigger is held in the active position by a user. In other words, the trigger may be configured to function as a dead man's switch.

The trigger may be movable to a position in which both the first and second biasing members urge the trigger, and in that position the influence on the trigger of the second biasing member may be larger than the influence on the trigger of the first biasing member. This may be beneficial in ensuring that there is no 'dead ground' within which the trigger is not acted upon by either biasing member, as otherwise the trigger could rattle between positions within this dead ground.

The position in which both the first and second biasing members urge the trigger may be the active position, the passive position, and/or a different position.

The influence of a biasing member of the trigger should be interpreted to mean the magnitude of the effect of that biasing member on the trigger. For instance, where the trigger moves linearly, the influence of a biasing member on the trigger is the component of the force exerted on the trigger by that biasing member in a direction parallel to the direction of motion of the trigger. As another example, where the trigger is pivotable the influence of a biasing member on the trigger is the moment exerted on the trigger (directly or indirectly) by the biasing member.

Preferably, the appliance is configured such that the switch assembly is in the motor-disconnecting state when the trigger is in the position in which both the first and second biasing members urge it.

Optionally:
i) the first biasing member is arranged to urge the trigger all the way to the active position; and
ii) the second biasing member is arranged to urge the trigger, against the bias of the first biasing member, to an intermediate position which is between the active and passive positions.

The intermediate position is an example of a position in which both the first and second biasing members urge the trigger.

The power source may be a battery, and the battery and switch assembly may be provided in a battery pack that is removably mounted to the main body.

Advantages of the present invention relating to the ability to use more relaxed tolerances, as discussed above, may be particularly beneficial in such apparatus. The mating or co-operating components required for a removable battery pack can be particularly susceptible to problems due to manufacturing variance (for instance because of the increased complexity of the appliance and the greater number of functional interactions required between components). An appliance which is more tolerant of manufacturing variation may therefore be of particular benefit.

The main body may comprise the handle, and the battery pack may be removably mounted to the handle.

The battery pack may be removably mounted to the main body by any suitable mechanism. For example, the battery pack may be removably mounted to the main body using one or more catches, for instance where the battery pack is intended to be removed frequently by the user (such as for charging). As another example, the battery pack may be removable mounted using threaded fasteners, for instance where removal of the battery pack is likely to be relatively infrequent.

As an alternative, the power source may be a battery that is not provided in a battery pack, or a battery that is provided in a battery pack which is permanently mounted to the main body and/or which does not comprise the switch assembly. As another alternative, the power source may be mains electricity which is accessed by plugging the appliance into a domestic wall socket.

For the avoidance of doubt, the term 'battery' is intended to include a single cell.

The trigger may have a contact surface positioned for receipt of a user's finger thereon, and the contact surface may be spaced further from the handle when the trigger is in the passive position than when the trigger is in the active position. Such a trigger may be advantageous in that it operates in the same general way as the trigger of a gun, which is particularly ergonomic and is universally understood by potential users.

Part of the trigger may be received within the handle, and part of the trigger may project from the handle when the trigger is in the passive position. This may be advantageous in that the handle can shield portions of the trigger which are not intended to receive user input, thereby reducing the risk of the trigger being operated inadvertently by a knock.

The contact surface may be substantially flush with an outer surface of the handle when the trigger is in the active position. This can reduce user fatigue, since it generally feels more natural and is less tiring to grip a body with a generally contiguous surface than a body which requires one or more fingers (for instance the 'trigger finger') to be more extended or more tightly clenched than other fingers.

The trigger may be pivotable relative to the handle.

Advantages of the present invention which relate to the ability to use more relaxed tolerances, as discussed above, may be particularly beneficial in such appliances. A pivoting trigger may be particularly susceptible to problems due to manufacturing tolerances because the behavior of the trigger is affected by a greater number of factors. A pivotable trigger affected by the forces applied to it and the directions of those forces, as a sliding trigger would be, but unlike a sliding trigger it is also affected by the perpendicular distances from those forces to the pivot axis of the trigger. The additional dependence of a pivotable trigger on the exact geometry of the appliance means that a pivotable trigger may have a greater chance for different manufacturing variances in the above factors to compound together and amplify a variation in the behavior of the trigger. Accordingly, an appliance which has a pivoting trigger and which is more tolerant of manufacturing variation may be of particular benefit.

In addition, utilizing a pivoting trigger may offer advantageously low internal friction, and thus an advantageously light trigger, in comparison to a trigger which utilizes sliding movement. A pivoting trigger can be arranged such that most or all of the frictional resistance it experiences takes place at the pivot, whereas a sliding trigger generally experiences greater friction due to the need for it to slide on rails or the like.

The second biasing member may be configured to act on the trigger at a point which is further from the pivot point of the trigger than a point on the trigger on which the first biasing member acts. This can be advantageous in that it allows the second biasing member to have a mechanical advantage over the first biasing member, thereby allowing the second biasing member to overcome the influence of the first biasing member (where desired) without necessarily having to be stronger.

The second biasing member may be configured to apply a moment to the trigger of no more than 0.4 Nm, for instance no more than 0.3 Nm. Preferably, the second biasing member is configured to apply a moment to the trigger of no more than 0.25 Nm, for instance no more than 0.1 Nm or no more than 0.05 Nm.

The second biasing member may be configured to apply a moment to the trigger of no less than 0.01 Nm, for instance no less than 0.02 Nm.

The first biasing member may be configured to apply a moment to the trigger of no more than 0.1 Nm, for instance no more than 0.08 Nm. Preferably, the first biasing member is configured to apply a moment to the trigger of no more than 0.06 Nm, for instance no more than 0.03 Nm or no more than 0.01 Nm.

The first biasing member may be configured to apply a moment to the trigger of no less than 0.001 Nm, for instance no less than 0.003 Nm or no less than 0.005 Nm.

The second biasing member may be configured to apply a biasing force to the trigger of no more than 15N, for instance no more than 10N. Preferably, the second biasing member is configured to apply a biasing force to the trigger of no more than 8N, for instance no more than 4N or no more than 2N.

The second biasing member may be configured to apply a biasing force to the trigger of no less than 0.1N, for instance no less than 0.4N or no less than 0.8N The first biasing member may be configured to apply a biasing force to the trigger of no more than 10N, for instance no more than 8N. Preferably, the first biasing member is configured to apply a biasing force to the trigger of no more than 6N, for instance no more than 4N or no more than 2N.

The first biasing member may be configured to apply a biasing force to the trigger of no less than 0.1N, for instance no less than 0.3N or no less than 0.5N The trigger and the second biasing member may be arranged such that moving the trigger to the active position, against the bias of the second biasing member, requires a force of no more than 15N, for instance no more than 10N, to be applied to the trigger in the direction of motion of the trigger. Preferably, the trigger and the second biasing member are arranged such that moving the trigger to the active position against the bias of the second biasing member requires a force of no more than 8N, for instance no more than 5N or no more than 3N, to be applied to the trigger in the direction of motion of the trigger.

The trigger and the second biasing member may be arranged such that moving the trigger to the active position, against the bias of the second biasing member, requires a force of no less than 0.1N, for instance no less than 0.4N or no less than 0.8N, to be applied to the trigger in the direction of motion of the trigger.

The biasing member or at least one of the biasing members may be a resilient member. A resilient member may be an advantageously simple, cheap and/or reliable form of biasing member. The resilient member may take any suitable form, for instance a spring such as a coil spring, leaf spring, volute spring or stack of Belleville washers, or an elastomeric rod or block.

Alternatively or in addition, the or at least one of the biasing members may be an actuator such as a solenoid.

Optionally:

i) the switch assembly comprises a reciprocable actuating member;
ii) the actuating member is movable by the trigger from a first position to a second position;
iii) the switch assembly is in the motor-disconnecting state when the actuating member is in the first position, and is in the motor-connecting state when the actuating member is in the second position.

The second biasing member may urge the actuating member to the first position, thereby biasing the trigger towards the passive position.

The actuating member may be a push-button, and moving the actuating member from the first position to the second position may involve pushing the button.

The switch assembly may comprise a switch that is operated by the trigger, the switch assembly being in the motor-connecting state when the switch is open, and in the motor-disconnecting state when the switch is closed.

This may be advantageous in that the switch assembly can be arranged so that a very small amount of travel of the trigger, applied to the switch, can lead to the switch assembly entering the motor-connecting state. Accordingly, the appliance can begin to operate seemingly instantaneously upon operation of the trigger.

In addition, this arrangement can allow the trigger to travel beyond the point at which the switch assembly enters the motor-connecting state, whereupon slight movement of the trigger (for instance due to a user shifting the position of a finger on the trigger) does not cause the switch assembly to enter the motor-disconnecting state. The appliance can therefore be less prone to accidental deactivation during use.

Optionally:
i) the trigger has an operating portion which is arranged to act on the switch assembly such that movement of the trigger from the passive position to the active position moves the switch assembly from the motor-disconnecting state to the motor-connecting state; and
ii) the first biasing member urging the trigger towards the active position acts to urge the operating portion against a part of the switch assembly.

As an alternative, a part of the switch assembly (for instance an electrical contact of the switch assembly) may be provided on the trigger, or the trigger may be monitored by a controller which senses trigger movement and changes the state of the switch assembly in response.

Said part of the switch assembly may an actuating member.

The domestic appliance may be configured such that with the operating portion of the trigger in contact with the actuating member of the switch assembly, the force exerted on the actuating member by the operating portion due to the influence of the first biasing member is no greater than the force exerted on the operating portion by the actuating member due to the influence of the second biasing member.

The domestic appliance may be a vacuum cleaner, and the electric motor may be part of a suction generator. For instance, the motor may drive a fan to generate suction.

According to a second aspect of the present invention there is provided a part of a domestic appliance according to the first aspect of the invention, wherein said part comprises at least the handle, the trigger and the first biasing member.

A main body according to the second aspect of the invention may provide one or more of the advantages discussed above with respect to the first aspect of the invention.

The part may be a main body which has a motor and a cyclonic separating device (for instance in some embodiments where the domestic appliance is a handheld vacuum cleaner or a stick vacuum cleaner). As an alternative, the part may be a wand assembly or hose assembly which is connectable to a main body that comprises a motor and a cyclonic separating device (for instance in some embodiments where the domestic appliance is a cylinder vacuum cleaner or an upright vacuum cleaner).

BRIEF DESCRIPTION OF THE DRAWINGS

Embodiments of the present invention will now be described, by way of example only, with reference to the accompanying drawings in which.

DETAILED DESCRIPTION OF THE INVENTION

Figure 1:
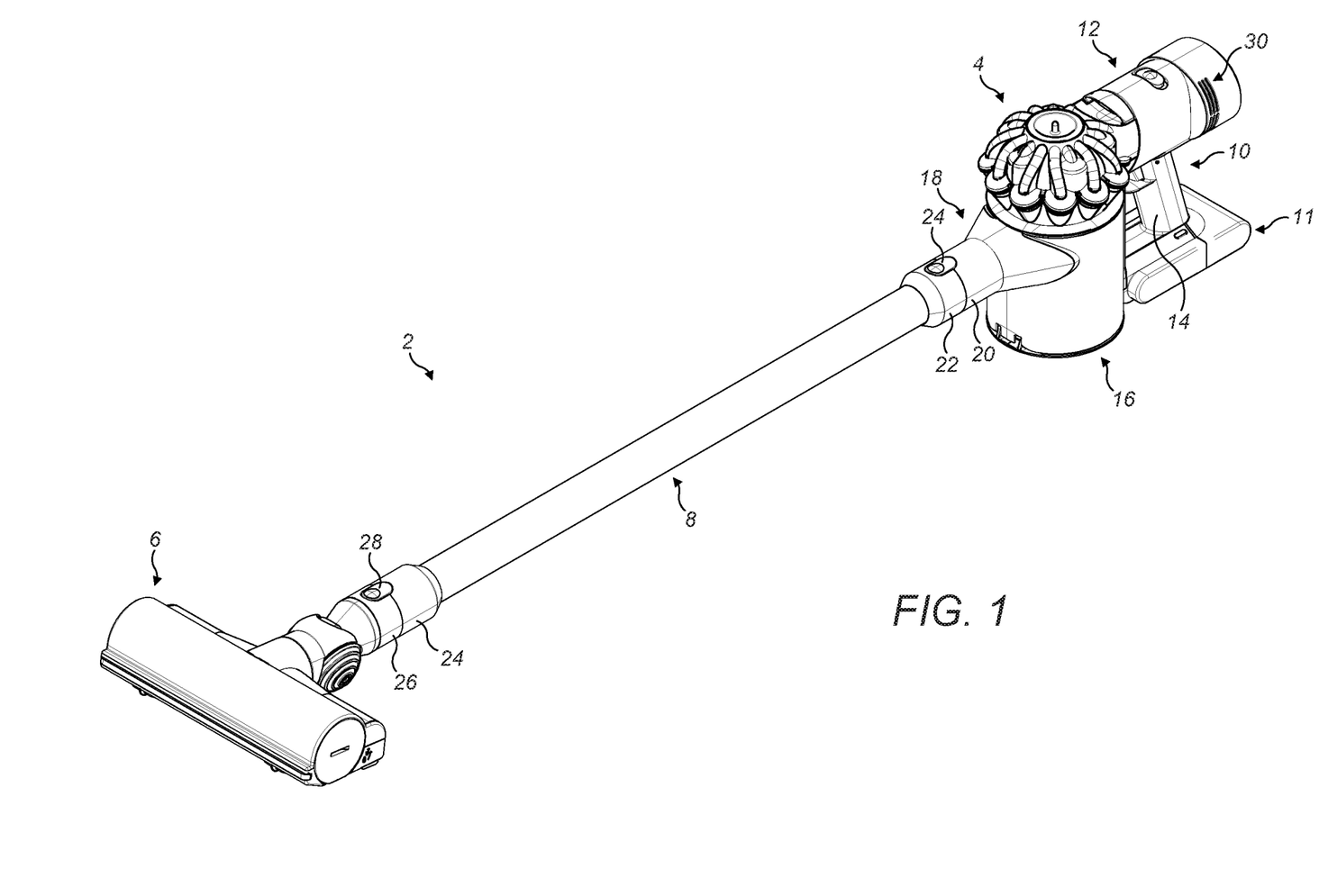
FIG. 1 is a perspective view of a stick vacuum cleaner according to an embodiment of the invention.

FIG. 1 shows a vacuum cleaner according to an embodiment of the present invention. The vacuum cleaner 2 of this embodiment is a stick vacuum cleaner of generally conventional structure. It has a vacuum unit 4, shown in isolation in FIG. 2, which is connected to a brush tool 6 by a wand 8. It is noteworthy that in this particular embodiment, the vacuum cleaner 2 can be converted from a stick-vac into a handheld machine simply by removing the wand 8 and connecting the brush tool 6 directly to the vacuum unit 4.

Figure 2:
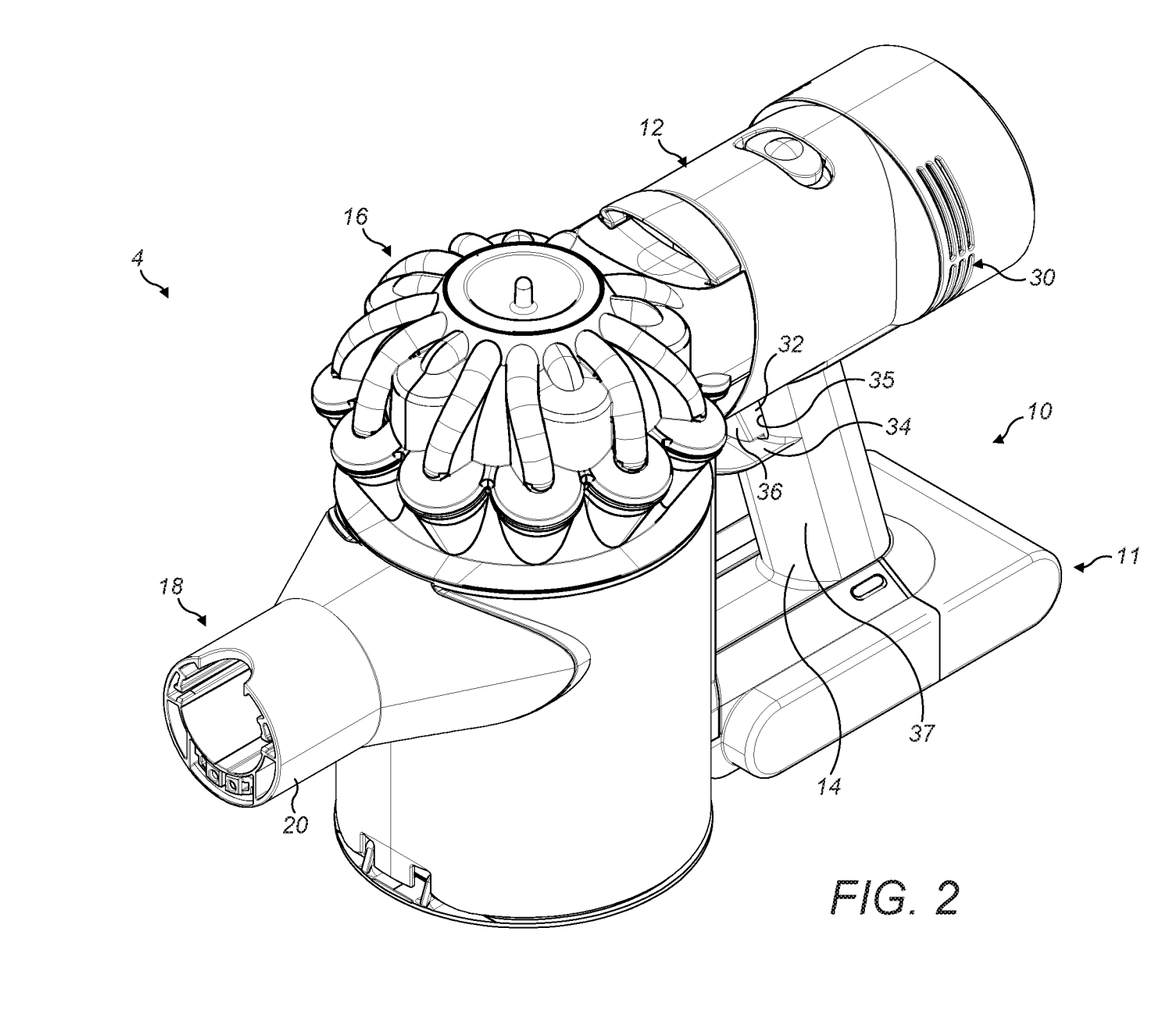
FIG. 2 is a perspective view of a vacuum unit of the vacuum cleaner of FIG. 1.

The vacuum unit 4 has a main body 10 and a battery pack 11. The main body 10 has a chamber 12 that houses a motor (not visible) which receives power from the battery pack 11. Generally below the chamber 12 is a handle 14, and generally forwards of the chamber 12 and handle 14 is a cyclonic separating apparatus 16. The cyclonic separating apparatus 16 functions to remove dirt, dust and other debris from a dirt-bearing airflow drawn into the vacuum unit 4 by a fan that is driven by the motor.

It should be noted at this point that although the separating apparatus described here is cyclonic, this is not essential and other separating apparatus are viable, for example other bagless-type separating apparatus which feature a fibrous filter element in a whirl-chamber to separate contaminants from the airstream, or even a bagged-type separating apparatus as is common in the art. The precise configuration of the cyclonic separating apparatus is not material to the present invention and so will not be described in detail here. However, one particular configuration of cyclonic separating apparatus that is suitable is described in the applicant's patent application publication number GB2475312A, which is incorporated herein by reference.

The forward end of the vacuum unit 4 has a nozzle 18 through which the dirt-bearing airflow enters the cyclonic separating apparatus 16. The nozzle 18 terminates in a connector 20 which engages with a complementary connector 22 of the wand 8. A catch 24, which in this case is provided on the wand 8, releasably secures the connectors 20, 22 together. The forward end of the wand 8 has a further connector 24, which engages with a complementary connector 26 on the brush tool 6. Again, the connectors are secured in place by a catch 28 (which in this particular embodiment is provided on the brush tool 6).

The general cleaning operation of the vacuum cleaner 2 is not material to the present invention and will therefore not be described in detail. In short, when supplied with power from the battery pack 11, the fan which is driven by the motor draws air up through the brush tool 6, through the wand 8 and into the cyclonic separating apparatus 16. The cyclonic separating apparatus 16 separates the dirt and dust from the air and retains the dirt and dust. The fan draws the cleaned air from the cyclonic separating apparatus 16 and expels from the vacuum cleaner 2 through a set of exhaust vents 30 (via a filter, in this case).

As shown more clearly in FIG. 2, in this particular embodiment the handle 14 of this embodiment takes the form of a 'pistol grip'. In this case the pistol grip 14 runs generally vertically (from the perspective of FIG. 2) but is inclined slightly forwards, which is ergonomically beneficial. In this case the handle 14 is inclined by about 10 degrees, however any angle between 0 and around 20 degrees is believed to be suitable. In this embodiment, the battery pack 11 is mounted to the main body 10 generally beneath the handle 14. The battery pack 11 and the motor and fan (not visible) being positioned on opposite ends of the handle 14 provides the vacuum unit 4, and the vacuum cleaner 2 as a whole, with particularly ergonomic weight balance.

The handle 14 comprises a trigger 32, which in this case resembles the trigger of a gun, by which the user selectively operates the vacuum cleaner 2. The handle 14 also has a finger rest 34 which in this embodiment takes the form of a generally horizontal shelf that projects forward from the handle 14 immediately beneath the trigger. The presence of a finger rest 34 allows the vacuum cleaner to be supported and carried by a user more easily. For instance, the user can grip the handle 14 relatively loosely, with some of the weight of the vacuum unit being born by the finger rest 34 being supported on their middle finger. The finger rest 34 projecting adjacent to the trigger (in this case beneath it) has the additional advantage that it can help to prevent a user's finger from inadvertently slipping off the trigger. In other embodiments, the finger rest 34 may not be a shelf, but may take another suitable form such as a pin or peg, or a tapered projection such as a peak between a finger scallop on the trigger and an adjacent finger scallop on the handle.

With the trigger 32 in the position shown, a portion of the trigger is received within the handle 14 and a portion projects from the handle through an aperture 35. When the trigger is 'pulled', the contact surface 36 of the trigger (i.e. the surface upon which the user puts their finger) is pushed backwards and becomes flush with the front outer surface 37 of the handle 14. In other words, when the trigger 32 is pulled the trigger and handle 14 form a generally contiguous body (in this case with the exception of the finger rest 34) to be gripped by the user. This can reduce user fatigue, since it generally feels more natural and is less tiring to grip a contiguous body (for instance one which allows one's fingers to be generally in line) than to grip a more complex shape. For instance, if the contact surface 36 trigger 32 instead remained proud of the handle 14 when the trigger was pulled, the user would need to grip the handle while keeping their index finger partially extended. The latter can be particularly uncomfortable in arrangements (including the present embodiment, as discussed below) where the trigger takes the form of a 'dead man's switch' which must be held down in order for the device to continue to operate. In this case, the contact surface and the front outer surface 37 of the handle 14 are both convex with a generally continuous shape along the longitudinal axis of the handle, however in other embodiments each may take any other suitable form.

Figure 3:
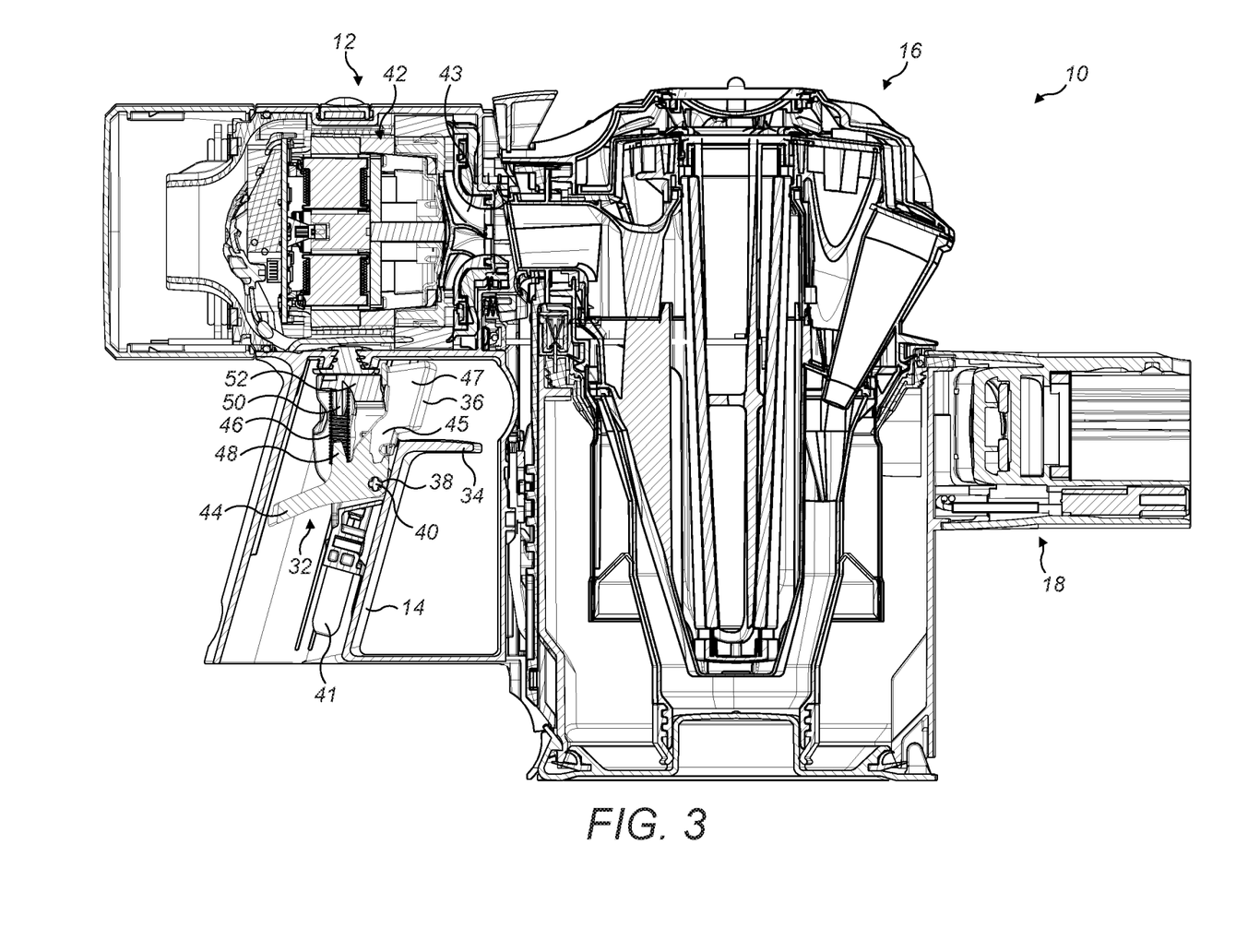
FIG. 3 is a cross-sectional side view of a main body of the vacuum unit of FIG. 2.

A cross-sectional view of the main body 10 is shown in FIG. 3. In this figure the trigger 32 is shown in an active position, i.e. a position in which power can be delivered to the motor 42 in the chamber 12, so that the vacuum cleaner 2 operates (in this case a position reached by the trigger when it is 'pulled' by a user). As discussed below, the trigger 32 is also movable to a passive position, i.e. a position in which power is not delivered to the motor 42 so that the vacuum cleaner 2 does not operate. In this case, if the trigger 32 was in the passive position its contact surface would project further forwards (i.e. further from the aperture 35 in the handle 14). Accordingly, it will be understood that 'pulling' the trigger 32 urges it towards the active position.

As shown in FIG. 3, the trigger 32 of this embodiment is pivotally mounted with respect to the handle 14, which is generally hollow and houses a portion of the trigger. In this case, the trigger 32 has an aperture 38 which receives a pin 40 that extends laterally (i.e. into the page from the perspective of FIG. 3) across the handle 14. The aperture 38 is rotatable about the pin 40, allowing the pin to form an axis about which the trigger 32 can pivot relative to the handle 14. In this particular case moving the trigger 32 from the active position (as shown in FIG. 3) towards the passive position involves rotating it clockwise about the pivot axis 40, and similarly moving the trigger 32 from the passive position towards the active position involves rotating it anticlockwise about the pivot axis 40.

The trigger 32 of this embodiment has the general form of a bell-crank, with two arms 44, 45 defining an angle about the pivot axis 40. In this particular case, the angle is around 100 degrees, with arm 44 running approximately horizontally and arm 45 running generally in line with the handle (which, as noted above, is around 10 degrees beyond the vertical). Arm 45 is provided with a projecting portion 47 which extends through the aperture 35 in the handle 14 when the trigger is in the first position, and upon which the contact surface 36 is provided. Arm 44 is configured to operate a switch assembly so as to turn the vacuum cleaner 2 on (as discussed in more detail below). Arm 44 therefore constitutes an operating portion of the trigger.

FIG. 3 also shows the fan 43 which is attached to the motor 42. In this case the fan 43, like the motor 42, is positioned within the chamber 12. This figure also shows a pair of contacts 41 (only one of which is visible in FIG. 3) which are electrically connected to the motor 42, and a spring 46. The spring 46 in this case is a helical compression spring which is held in place between generally opposing projections 48, 50 extending from the trigger 32 and from a mounting boss 52 of the handle 14, respectively. The restorative force from the spring 46 acts to urge the trigger 32 to pivot anticlockwise from the perspective of FIG. 3. The spring 46 urges the trigger 32 away from the passive position and towards the active position, and therefore constitutes a 'first biasing member' within the meaning of the present invention. In this particular embodiment, the spring 46 is configured to urge the trigger 32 all the way to the active position, and the main body 10 of the vacuum cleaner 2 does not comprise any components which can move the trigger out of the active position. Accordingly, in this embodiment the trigger 32 rests in the active position, under action of the spring 46, when the main body 10 is isolated from the other components of the vacuum cleaner 2.

Figure 4:
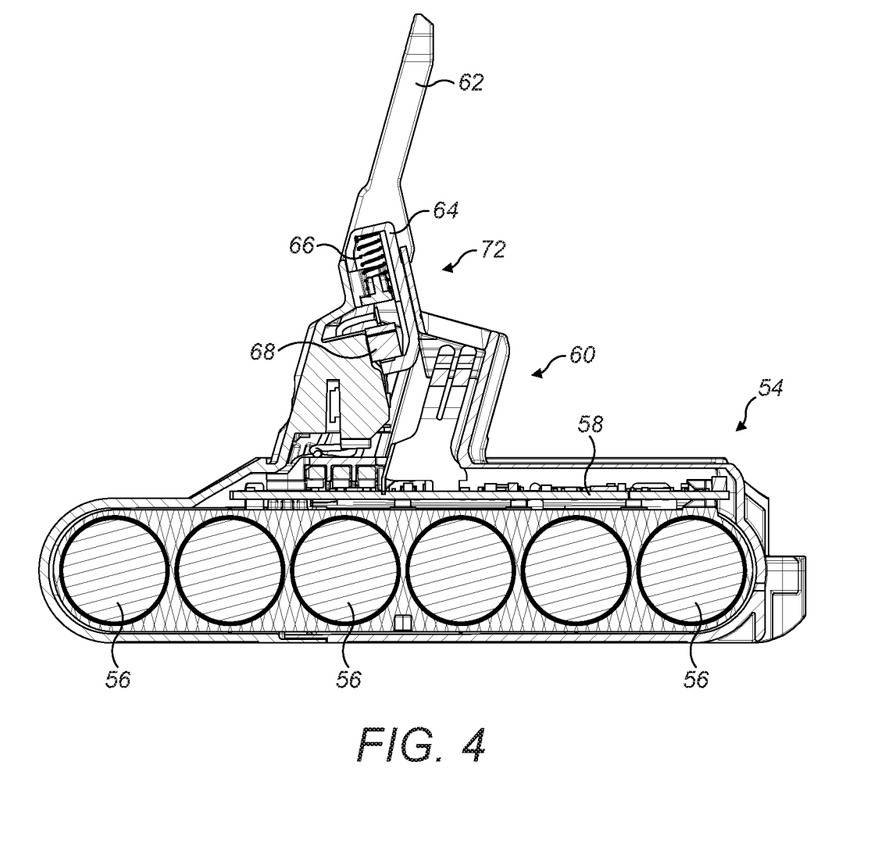
FIG. 4 is a cross-sectional side view of a battery pack of the vacuum unit of FIG. 2.

The battery pack 11 of the vacuum unit 4 is shown in isolation (in cross-section) in FIG. 4. The battery pack 11 has the same general form as is described in the applicant's patent application publication number WO2013117901A, which is incorporated herein by reference. The battery pack 11 has a slab-shaped portion 54 which houses an array of cells 56 and a circuit board 58, and a post 60 projecting from the slab portion 54. In this particular embodiment, the battery pack 11 is mounted to the main body 10 with the slab portion 54 running beneath the handle 14 (as shown in FIGS. 1 and 2), and the post 60 received within a cavity in the handle 14.

The post 60 has an alignment prong 62, an actuating member 64, a spring 66, a switch 68 and a pair of contacts 70. The actuating member 64, spring 66 and switch 68, together with the circuit board 58 of the slab portion 54, forms a switch assembly 72. The switch assembly 72 is operable to supply electrical power from the cells 56 to the contacts 70 and thus to the motor, as discussed below. In this particular embodiment the switch 68 is a miniature snap-action switch, commonly known as a Micro-Switch™ however in other embodiments the switch 68 may take any other suitable form.

The switch assembly of this embodiment is operated by moving the actuating member 64 from a first position, as shown in FIG. 4, to a second position. In this embodiment, the actuating member 64 takes the form of a reciprocable push-button in that it is moved to the second position by depressing it (in this case moving it generally downwards from the perspective of FIG. 4a), i.e. 'pushing' the button. With the actuating member 64 in the first position, the switch assembly 72 is in a 'motor-disconnecting state' in that the cells 56 are not electrically connected to the contacts 70, so (when the main body 10 is assembled and the motor 42 is connected to the contacts as described below) the motor 42 cannot receive power from the cells 56. With the actuating member 64 in the second position, the switch assembly 72 is in a 'motor-connecting state' in that the contacts 70 are electrically connected to the cells 56, so when the motor 42 is connected to the contacts 70 it can receive power from the cells. The spring 66 in this case is a helical compression spring, and is configured to urge the actuating member 64 from the second position to the first position (i.e. generally upwards from the perspective of FIG. 4).

Figure 5:
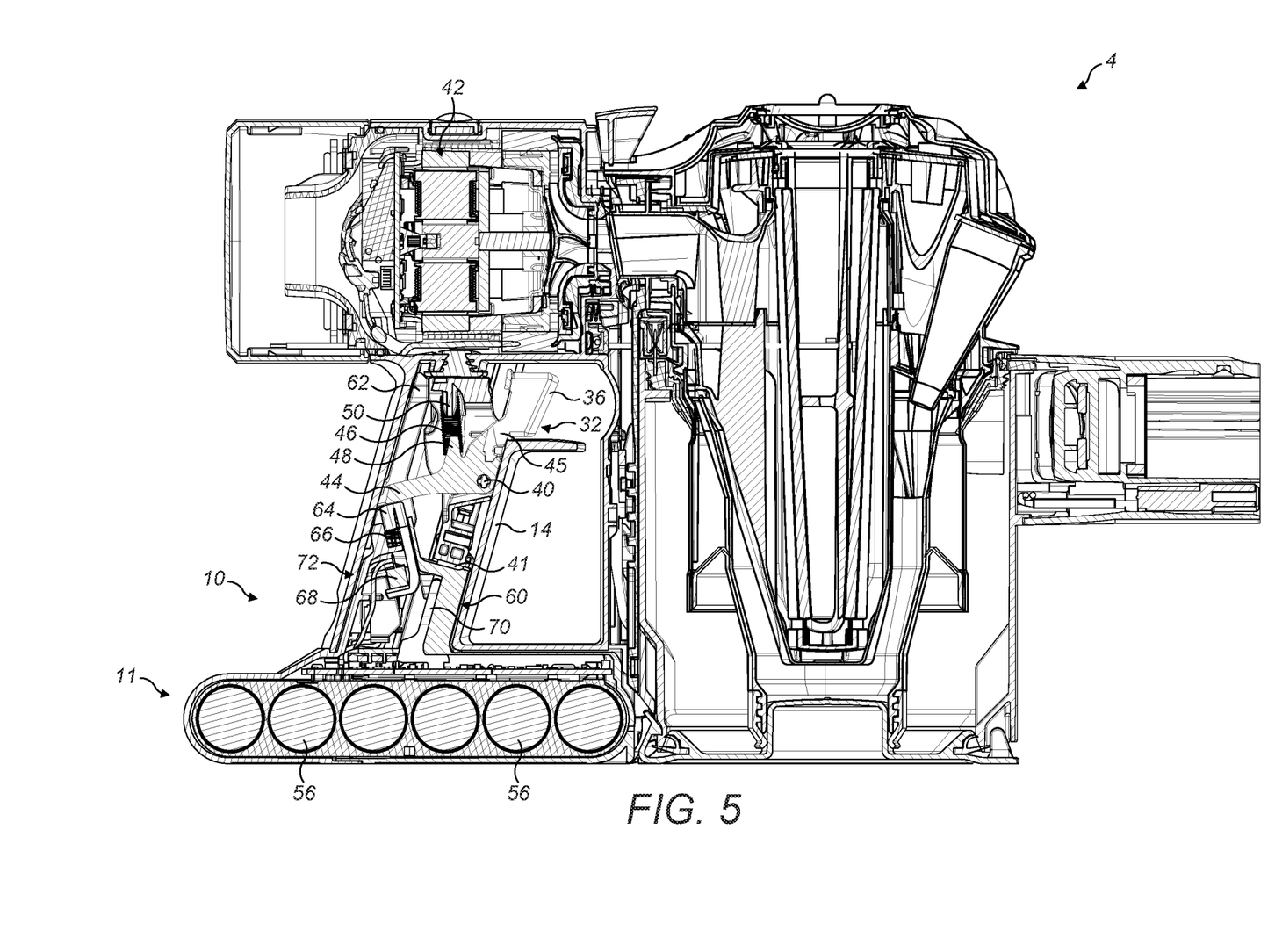
FIG. 5 is a cross-sectional side view of the vacuum unit of FIG. 2.

FIG. 5 shows a cross-sectional view the entire vacuum unit 4, i.e. the main body 10 and the battery 11. As shown in this figure, in the present embodiment the post 60 of the battery pack 11 is received within the hollow handle 14, with the slab portion 54 abutting the bottom of the handle 14 and the alignment prong 62 extending through substantially the entire height of the handle (in this case generally along the rear of the handle 14). With the battery 11 and the main body 10 mounted to one another, their respective contacts 70, 41 touch. Accordingly, when the cells 56 are connected to the contacts 70 of the battery pack 11 by the switch assembly 72, electrical power will be delivered from the contacts 70 to the motor 42 via the contacts 41 of the main body 10.

It is noteworthy that in FIG. 5 the trigger 32 lies in an intermediate position which is between the active position and the passive position. Moving the trigger 32 from this intermediate position to the active position would require the trigger to rotate anticlockwise about the pivot axis 40, and moving the trigger from the intermediate position to the passive position would require the trigger to rotate clockwise.

With the main body 10 and battery pack 11 assembled to form the vacuum unit 4, arm 44 of the trigger 32 and the actuating member 64 of the switch assembly 72 can interact. With the trigger 32 in the intermediate position, the actuating member 64 is in the first position and therefore the switch assembly 72 is in the motor-disconnecting state. Moving the trigger 32 clockwise from the intermediate position to the passive position (against the bias of the spring 46) would lift arm 44 from the actuating member 64 and would not result in a change of state of the switch assembly 72. However, moving the trigger 32 anticlockwise to the active position from this intermediate position (i.e. 'pulling' the trigger) would move its arm 44 downwards. The arm 44 would thus depress the actuating member 64, moving the switch assembly 72 to the motor-connecting state. Power would therefore be supplied from the cells 56 to the motor 42.

When the actuating member 64 is depressed towards the second position by the trigger 32 moving towards the active position, the spring 66 urges the actuating member back towards the first position as noted above. This has the effect of urging the trigger 32 away from the active position and towards the passive position. The spring 66 therefore constitutes a 'second biasing member' within the meaning of the present invention.

As noted above, in this embodiment spring 46 urges the trigger 32 from the passive position all the way to the active position (i.e. applies a force which would cause the trigger to move from the passive position all the way to the active position in the absence of any other forces). On the other hand, in this embodiment spring 66 urges the trigger 32 to the intermediate position (i.e. only part way to the passive position). Accordingly, when the trigger 32 is in the passive position or any position between the passive and intermediate positions, the trigger is only acted upon by spring 46. However, when the trigger is in the active position, intermediate position or any position therebetween, spring 46 and spring 66 urge the trigger 32 in opposite directions. In this embodiment, the trigger 32, spring 46 and spring 66 are arranged so that the spring 66 can move the trigger to the intermediate position against the bias of the spring 46. In this particular case, the spring 66 can override the force from the spring 46 both because spring 66 is stronger than spring 46 (i.e. spring 66 applies a greater force to the trigger 32), and because spring 66 acts on the trigger at a greater distance from the pivot axis 40 of the trigger (meaning that spring 66 has a mechanical advantage).

Since the trigger 32 is arranged to move to the intermediate position from the passive position (under action of spring 46), and to move to the intermediate position from the active position (under action of spring 66 against the bias of spring 46), the trigger exhibits a 'self-centering' action about the intermediate position in that it will return to the intermediate position after being disturbed therefrom. Further, since the switch assembly 72 is in the motor-disconnecting state (i.e. power is not delivered to the motor 42) when the trigger 32 is in the intermediate position, the trigger 32 of this embodiment takes the form of a 'dead-man's switch' which must be held down for the vacuum cleaner to operate.

With the trigger in the intermediate position, spring 46 continues to urge the trigger anticlockwise (i.e. towards the active position) but spring 66 prevents the trigger from moving beyond the intermediate position. Arm 44 of the trigger 32 therefore rests on the actuating member 64 (with the actuating member in the first position) until the trigger is acted upon by a user. With arm 44 resting on switch, the trigger 32 is particularly responsive in that as soon as the user pulls the trigger, the actuating member 64 will begin to move under the influence of arm 44. In contrast, if the trigger was configured to lie in a position further clockwise, the user would have to pull the trigger to the position at which the arm 44 contacts the actuating member 46, and then keep pulling so that the arm 44 moved the actuating member. This arrangement would therefore have a less responsive trigger action, and a longer trigger pull which may increase user fatigue.

In addition, the present embodiment (as with many other embodiments of the invention) can allow more relaxed manufacturing tolerances to be utilized, which in turn can reduce tooling costs and wastage (e.g. of parts which are discarded due to being outside acceptable tolerances). In the present embodiment, with the trigger 32 being urged to the position in which the arm 44 contacts the actuating member 64, any 'slack' in the trigger is taken up, which means that the trigger is responsive and does not rattle. This responsiveness and lack of rattle can be provided regardless of manufacturing variation (within reason)—such variation may alter the exact resting position of the trigger 32, but due to the spring 46 it will nonetheless rest with its arm 44 touching the actuating member.

This contrasts with the situation for arrangements which do not utilise the present invention, such as the arrangement which would be provided if the apparatus shown in FIG. 5 did not utilize spring 46 so as to hold arm 44 against the actuating member 46, but instead was designed so that the limit of the trigger's travel was the position at which the arm 44 and actuating member 46 touch. This could be achieved, for example, by providing a surface on the handle 14 which was positioned to contact a surface on the trigger 32 when the trigger was in that position. In this arrangement, slight deviations in geometry due to manufacturing variation would mean that in some instances these surfaces would contact each other with the trigger 32 more clockwise, or more anticlockwise, than the position in which arm 44 touches the actuating member 64. In the former case, the trigger would rattle between the position at which the surface of the trigger 32 contacts the surface of the handle 14, and the position in which the arm 44 touches the actuating member. In the latter case, the trigger would be held in a position in which the arm 44 depresses the actuating member, which would mean that the vacuum cleaner 2 could not be switched off.

It will be understood from the above description of the present embodiment that the manner in which the trigger behaves 32 is determined in large part by the influences of the springs 46, 66 thereupon. There are numerous simultaneous design constraints placed upon the springs 46, 66 and the trigger 32. For instance, in the present embodiment the influence from the spring 66 should exceed that of the spring 46 (at least when the trigger is in the active position), and should exceed it by a sufficient amount to avoid deviations in manufacturing tolerances leading to spring 66 not having sufficient strength to overcome spring 46, and to avoid the trigger being movable to the active position under its own weight or inertia. However, spring 66 should not be powerful enough for it to be difficult or tiring for a user to pull the trigger and move it to the active position against the bias of that spring 66. In addition, in this embodiment it is desirable for the spring 46 to be relatively weak so as to avoid introducing unnecessary stress on the components that support it, but not so weak as to be overcome by the weight or inertia of the trigger alone whereupon the trigger could rattle). It will be appreciated that the requirements of trigger performance will vary depending on the particular apparatus to which the present invention is applied. However, by way of an example, the particular configuration of the trigger 32 and springs 46, 66 of this particular embodiment will be described with reference to FIG. 6, which is an enlarged cross-sectional view of the trigger 32 and springs 46, 66 (with the trigger in the intermediate position).

Figure 6:
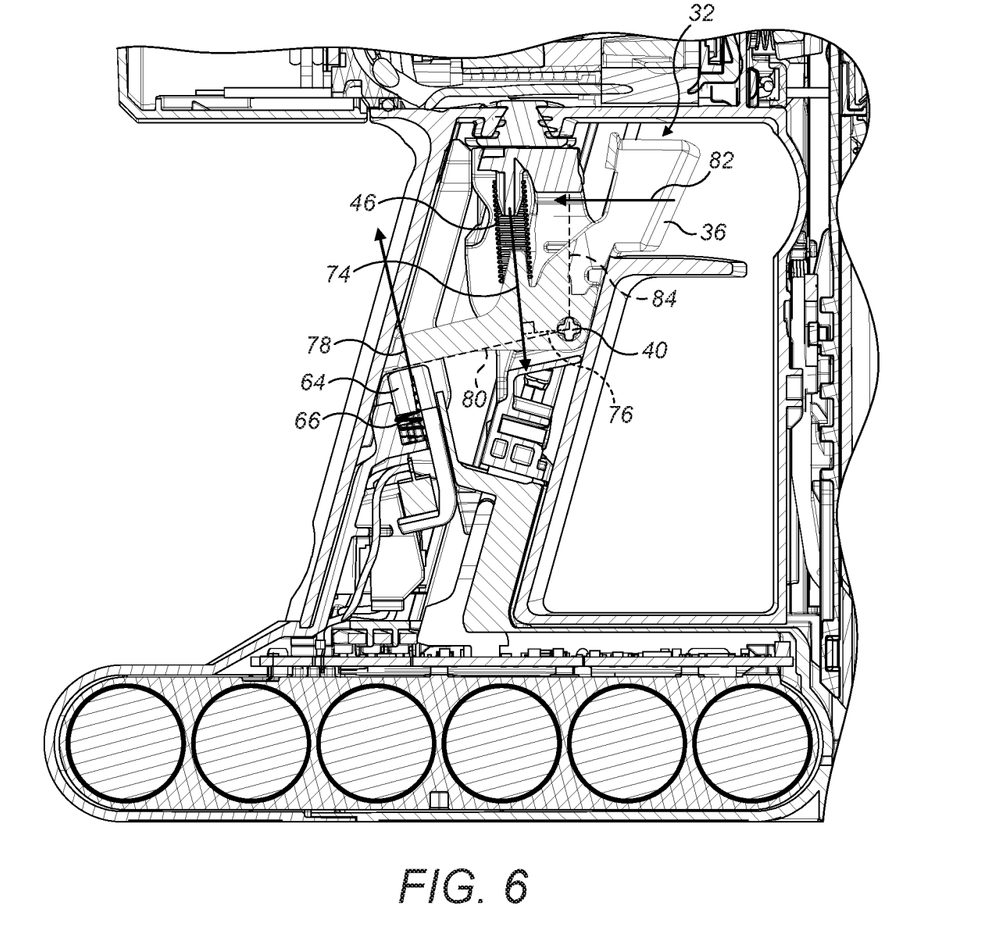
FIG. 6 is an enlargement of part of FIG. 5, with annotations.

As discussed above the trigger 32 of this embodiment pivots about an axis 40. Accordingly, the relative influence of the springs 46, 66 is determined by the magnitudes of the moments that they exert upon the trigger 32. As an initial point, the situation below has been simplified for ease of understanding. For instance, although the forces applied by the springs 46, 66 would usually vary depending on the exact position of the trigger 32 (which would affect the exact displacements of the springs), they will be discussed as though they exert constant forces over the displacements that they experience. Similarly, although the forces from the springs 46, 66 would be spread over an area, for the sake of simplicity they are considered to be point loads.

In relation to spring 46, this exerts a force 74 on the trigger of around 0.75N. The perpendicular distance 76 from this force (which is considered to be applied at the central point of the spring 46) to the pivot axis 40 is around 9 mm, therefore the influence of the spring 46 on the trigger 32 is a moment of around 0.007 Nm. Turning to spring 66, this exerts a force 78 of around 1N. The perpendicular distance 80 between this force (which is considered to be applied at the centre of the actuating member 64) and the pivot axis 40 is around 30 mm, therefore the influence of this spring 66 on the trigger 32 is a moment of around 0.03 Nm.

With the trigger 32 in the intermediate position, the moments exerted on the trigger 32 by the springs 46, 66 are in equilibrium and the spring 66 does not exert its full force. However, if the trigger 32 was urged towards the active position with sufficient strength then the full force of spring 66 would then be exerted. At that point, the moments produced by the springs 46, 66 would oppose one another but leave a resultant moment of around 0.023 Nm clockwise. To overcome this moment and move the trigger to the active position, the user would need to apply a rearward force 82 to the contact surface 36 of the trigger 32 which would exert a moment of the same magnitude. Since the perpendicular distance 84 from the centre of the contact surface 36 to the pivot axis 40 is around 23 mm, a force 82 of around 1N would be sufficient to move the trigger to the active position. For the sake of comparison, the force required to pull the trigger of a handgun is generally in the range of 20N-60N.

Figure 7A:
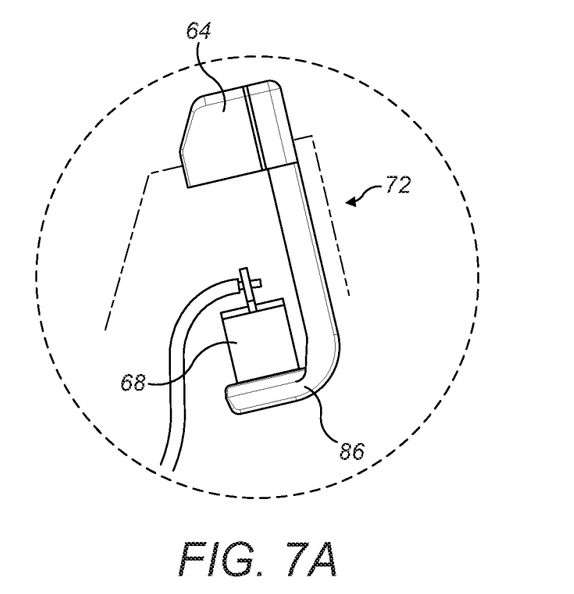
FIGS. 7A and 7B are cross sectional side views of an actuating member and switch of the battery pack of FIG. 4, with the actuator in first and second positions respectively.
Figure 7B:
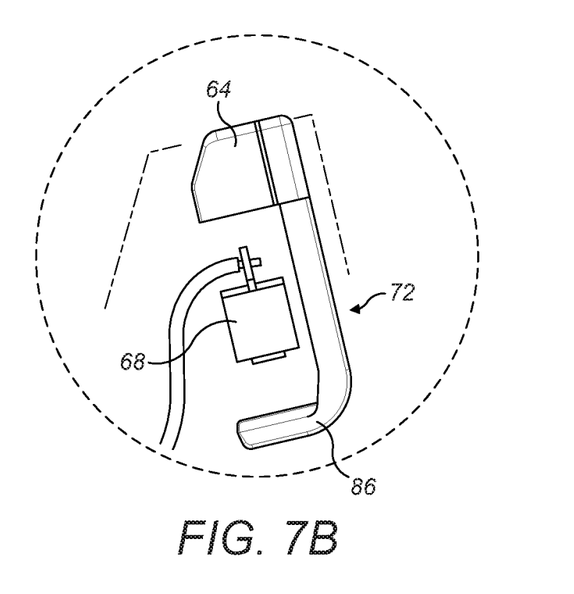

The particular arrangement of the switch assembly 72 of the present embodiment will now be discussed with reference to FIGS. 7A and 7B. FIG. 7A shows a close-up of the actuating member 64 and switch 68 with the actuator in the first position, and FIG. 7B shows the actuating member in the second position. Referring to these figures in combination, it can be seen that when the actuating member 64 is in the first position an arm 86 of the actuating member it is in contact with the switch 68, whereas in the second position the arm 86 of the actuating member 64 is not in contact with the switch 68.

Contrary to what one might expect, in this embodiment the switch 68 is open when the switch assembly 72 is in the motor-connecting state, and closed when the switch assembly is in the motor disconnecting state. Rather than being wired directly between the cells 56 and the contacts 70, the switch 68 is wired to the circuit board 58. The circuit board 58 detects opening/closing of the switch 68, and causes the switch assembly 72 to enter the motor-connecting state or motor-disconnecting state in response. More specifically, moving the actuating member 64 from the first position to the second position releases the switch 68 and opens its contacts. This is detected by the circuit board 58, which operates a second switch (not visible) such as a transistor so that the switch assembly 72 enters the motor-connecting state and connects the cells 56 to the motor 42 (via the contacts 41, 70). Similarly, moving the actuating member 64 from the second position to the first position presses the switch 68 and connects its contacts. This is detected by the circuit board 58, which operates the additional switch (not visible) so that the switch assembly 72 enters the motor-disconnecting state and disconnects the cells 56 from the motor 42.

This arrangement is advantageous in that when the actuating member 64 is in the first position (i.e. the switch 68 is closed and the switch assembly 72 is in the motor-disconnecting state), a very small amount of travel of the actuating member 64 results in the switch 68 becoming open (and thus the switch assembly 72 entering the motor-connecting state). Since the actuating member 64 is moved from the first position to the second position by moving the trigger 32, this equates to a very small amount of travel of the trigger 32 resulting in power being delivered to the motor 42. Accordingly, the vacuum cleaner 2 can begin to operate seemingly instantaneously upon pulling the trigger 32. In other words, this arrangement allows the vacuum cleaner 2 to have a particularly responsive trigger because movement of the trigger 32 from the intermediate position to the active position can happen almost instantaneously.

In addition, the above arrangement allows continued travel of the actuating member 64 beyond the position at which the switch 68 is opened and the switch assembly 72 enters the motor-connecting state. In this particular embodiment, the actuating member 64 can move around 5 or 10 mm further after the switch 68 opens. During this additional travel, the state of the switch 64, and thus the state of the switch assembly 72, is not affected. Accordingly, the final position of the trigger, while being depressed by a user, is spaced some distance from the position at which the switch assembly 72 would transition between the motor-connecting and motor-disconnecting states. This, in turn, means that a user can release some of the pressure on the trigger 32 (and thus allow the actuating member 64 to move some distance back towards the first position), for instance when adjusting the position of their finger on the trigger 32, without the switch assembly 72 entering the motor-disconnecting position and causing the vacuum cleaner 2 to cease to operate.

It will be appreciated that numerous modifications to the above described embodiment may be made without departing from the scope of invention as defined in the appended claims. For instance, whilst in the above embodiment the trigger is acted upon by at least one of spring 46 and spring 66 (i.e. at least one of the first and second biasing members) at all points on its range of motion, in other embodiments there may be a position or range of positions of the trigger at which the trigger is not acted upon by either of the biasing members. In the case of an embodiment where there are a range of positions of the trigger at which it is not acted on by either biasing member, the trigger may rattle between positions within this range. Such an embodiment may nonetheless be beneficial over known arrangements, for instance due to increased trigger responsiveness or reduced (albeit not eliminated) trigger rattle.

In addition, although in the above embodiment the switch assembly is provided on a removable battery pack, in other cases the switch assembly may be provided in any other suitable location, whether or not a removable battery pack is provided.

The embodiment has been described in relation to the trigger being movable between an active position, a passive position and an intermediate position. However, since the first biasing member (spring 46) urges the trigger away from the intermediate position and towards the active position, and since the switch assembly is in the motor-disconnecting state when the trigger is in the intermediate position, it may instead be considered that the position described above as the intermediate position is in fact the passive position.

Whilst the embodiment above is a handheld vacuum cleaner, it is to be understood that the invention may also be applied to other types of vacuum cleaner such as upright and cylinder vacuum cleaners. Furthermore, the invention may also be applied to other domestic appliances, such as steam-cleaners (with the electric motor powering a steam delivery device or a water pump, for example), floor polishers and hairdryers.

The invention claimed is:

1. A domestic appliance comprising:
   an electric motor;
   a switch assembly for selectively connecting the motor to a power source;
   a handle; and
   a manually-operable trigger movable relative to the handle between an active position and a passive position,
   wherein:
   the trigger and the switch assembly are arranged such that the switch assembly is in a motor-connecting state when the trigger is in the active position, and is in a motor-disconnecting state when the trigger is in the passive position; and
   the domestic appliance comprises a first biasing member which is arranged to urge the trigger away from the passive position and towards the active position.

2. The domestic appliance of claim 1, further comprising a second biasing member which is arranged to urge the trigger away from the active position and towards the passive position.

3. The domestic appliance of claim 2, wherein the trigger is movable to a position in which both the first and second biasing members urge the trigger, and in that position the influence on the trigger of the second biasing member is larger than the influence on the trigger of the first biasing member.

4. The domestic appliance of claim 3 wherein:
   the first biasing member is arranged to urge the trigger all the way to the active position; and
   the second biasing member is arranged to urge the trigger, against the bias of the first biasing member, to an intermediate position which is between the active and passive positions.

5. The domestic appliance of claim 1, wherein the power source is a battery, and the battery and switch assembly are provided in a battery pack that is removably mounted to the main body.

6. The domestic appliance of claim 1, wherein the trigger has a contact surface positioned for receipt of a user's finger thereon, and the contact surface is spaced further from the handle when the trigger is in the passive position than when the trigger is in the active position.

7. The domestic appliance of claim 6, wherein a first part of the trigger is received within the handle, and a second part of the trigger projects from the handle when the trigger is in the passive position.

8. The domestic appliance of claim 7, wherein the contact surface is substantially flush with an outer surface of the handle when the trigger is in the active position.

9. The domestic appliance of claim 2, wherein the trigger is pivotable relative to the handle.

10. The domestic appliance of claim 9, wherein the second biasing member is configured to act on the trigger at a point which is further from the pivot point of the trigger than a point on the trigger on which the first biasing member acts.

11. The domestic appliance of claim 9, wherein the second biasing member is configured to apply a moment to the trigger of no more than 0.25 Nm.

12. The domestic appliance of claim 9, wherein the first biasing member is configured to apply a moment to the trigger of no more than 0.06 Nm.

13. The domestic appliance of claim 2, wherein the second biasing member is configured to apply a biasing force to the trigger of no more than 8N.

14. The domestic appliance of claim 1, wherein the first biasing member is configured to apply a biasing force of no more than 6N.

15. The domestic appliance of claim 2, wherein the trigger and the second biasing member are arranged such that moving the trigger to the active position, against the bias of the second biasing member, requires a force of no more than 8N to be applied to the trigger in the direction of motion of the trigger.

16. The domestic appliance of claim 1, wherein the first biasing member is a resilient member.

17. The domestic appliance of claim 2, wherein:
    the switch assembly comprises a reciprocable actuating member;
    the actuating member is movable by the trigger from a first position to a second position;
    the switch assembly is in the motor-disconnecting state when the actuating member is in the first position, and is in the motor-connecting state when the actuating member is in the second position.

18. The domestic appliance of claim 17, wherein the second biasing member urges the actuating member to the first position, thereby biasing the trigger towards the passive position.

19. The domestic appliance of claim 17 wherein the actuating member is a push-button, and moving the actuating member from the first position to the second position involves pushing the button.

20. The domestic appliance of claim 1, wherein the switch assembly comprises a switch that is operated by the trigger, the switch assembly being in the motor-connecting state when the switch is open, and in the motor-disconnecting state when the switch is closed.

21. The domestic appliance of claim 18, wherein:
    the trigger has an operating portion which is arranged to act on the switch assembly such that movement of the trigger from the passive position to the active position moves the switch assembly from the motor-disconnecting state to the motor-connecting state; and
    the first biasing member urging the trigger towards the active position acts to urge the operating portion against a part of the switch assembly.

22. The domestic appliance of claim 21, wherein the domestic appliance is configured such that with the operating portion of the trigger in contact with the actuating member of the switch assembly, the force exerted on the actuating member by the operating portion due to the influence of the first biasing member is no greater than the force exerted on the operating portion by the actuating member due to the influence of the second biasing member.

23. The domestic appliance of claim 1, wherein the domestic appliance is a vacuum cleaner, and the electric motor is part of a suction generator.

24. A part of a domestic appliance that comprises an electric motor and a switch assembly for selectively connecting the motor to a power source, the part comprising:
 a handle;
 a manually-operable trigger movable relative to the handle between an active position and a passive position; and
 a first biasing member,
 wherein:
 the trigger is configured to engage the switch assembly such that the switch assembly is in a motor-connecting state when the trigger is in the active position, and is in a motor-disconnecting state when the trigger is in the passive position, and
 the first biasing member is arranged to urge the trigger away from the passive position and towards the active position.

* * * * *